July 23, 1929.  J. KUBLER  1,722,149
ELECTRICAL APPARATUS
Filed Feb. 7, 1929

Inventor
Johannes Kubler
By
Attorney.

Patented July 23, 1929.

1,722,149

UNITED STATES PATENT OFFICE.

JOHANNES KUBLER, OF BADEN, SWITZERLAND.

ELECTRICAL APPARATUS.

Application filed February 7, 1929, Serial No. 338,067, and in Switzerland February 6, 1928.

This invention relates to improvements in electrical apparatus.

One of the objects of the invention is to provide an improved construction of electrical apparatus such as the so-called absorption reactances, to prevent the formation of eddy currents and the resultant heating of the walls of the associated container or casing of the apparatus by the stray magnetic lines of force created by the reactance coils.

Other objects and advantages will hereinafter appear.

Figure 1:
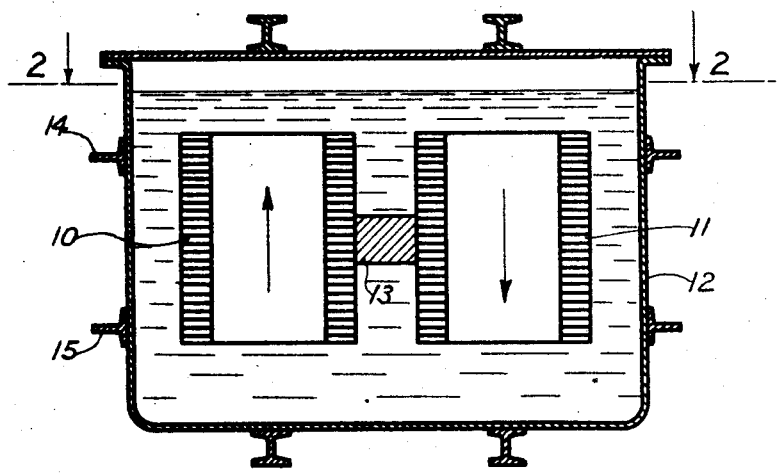
Figure 2:
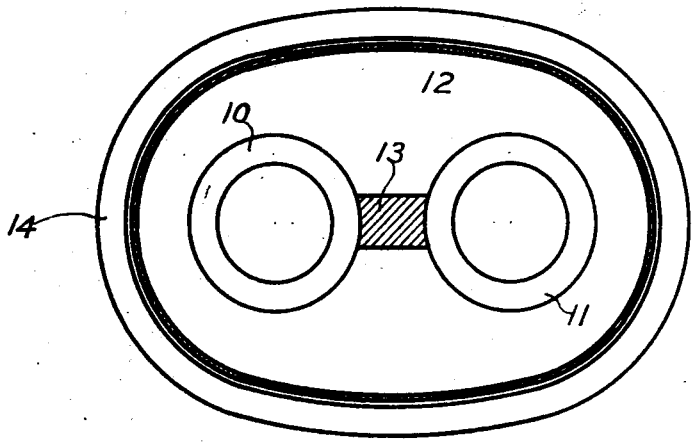

For the purpose of illustrating the invention, one embodiment thereof is shown in the drawings, wherein Figure 1 is a sectional elevational view of apparatus embodying the present improvements; and Fig. 2 is a sectional view, the section being taken on the line 2—2 in Fig. 1.

Reactance coils 10 and 11 are suitably supported in the oil-filled container 12 in spaced relation with respect to each other and with their respective axes in substantially parallel relation, as shown.

A suitable member or block 13 of insulating material is interposed between coils 10 and 11 for the purpose of holding the same in fixed spaced relation.

The container 12 is made of material having a relatively high electrical conductivity and a relatively low permeance such, for example, as copper or aluminum.

Bands 14 and 15 extend around the container, and provide a reinforcement therefor, the bands being made of material having a relatively high permeance such, for example, as steel.

The disposition and connection of coils 10 and 11 is such that during operation of the apparatus the magnetic lines of force pass through the coils in the direction of their axes, the lines of force in one coil running in the direction opposite to and opposing the lines of force in the other coil.

The action, therefore, is such that the stray magnetic lines of force flowing in the container walls from both coils run in opposite directions, the resultant effect being that the difference between the opposing eddy currents thus set up in the container walls is so small that the extent to which the latter are heated is not appreciable.

The stray lines of force emanating from coils 10 and 11 incident to operation of the apparatus are confined practically entirely within the container by the walls of the same of relatively high electrical conductivity. The reinforcing bands 14 and 15, exterior of container 12, are therefore shielded from such stray lines of force, and any appreciable heating of the bands, due to hysteresis which would otherwise occur, is accordingly prevented.

In the present improved apparatus, therefore, the container 12 of relatively high electrical conductivity functions to keep down the losses due to eddy currents to a degree lower than is the case in constructions proposed heretofore.

However, the material, such as copper, which would be employed to provide a container having the necessary degree of electrical conductivity, would have to be of relatively small gauge in order to keep the expense within practical limits. While such a container would not have the required strength, the bands 14 and 15 reinforce the container so that the same, for all practical purposes, is equivalent, as regards strength, to the steel tanks used heretofore and which have been responsible for appreciable losses due to hysteresis.

In the present construction the bands 14 and 15 cause no losses due to hysteresis for the reason that they are protected or shielded from the stray lines of flux by container 12.

It will therefore be seen that there is a distinct cooperative action between the tank or container 12 and bands 14 and 15, the latter providing adequate reinforcement for the tank, while the tank, in turn, shields the bands from the stray lines of flux occurring incident to operation of the apparatus and which would otherwise cause heat losses due to hysteresis in the bands.

Where the claim calls for material having a relatively high electrical conductivity and a relatively low magnetic-permeability, it is intended to mean material, such as copper or aluminum, having an electrical conductivity appreciably higher than steel and a magnetic-permeability appreciably lower than steel.

While but one embodiment of the invention has been shown and described, it will be appreciated that various changes may be made such as in the size, shape and arrangement of the parts without departing from the spirit of the invention or the scope of the claim, and that the present improvements may be embodied in electrical apparatus of other types than that shown.

The invention claimed is:

1. In electrical apparatus, a container of material having a relatively high electrical conductivity and a relatively low magnetic permeability, means disposed in said container and operable to provide for occurrence of magnetic lines of force upon operation of said apparatus, and means disposed exteriorly of said container and having a reinforcing action with respect thereto, said container providing a shield for said reinforcing means with respect to such lines of force.

In testimony whereof I have hereunto subscribed my name this 23rd day of January, A. D. 1929.

JOHANNES KUBLER.